Jan. 2, 1962    E. H. BLATTNER ETAL    3,015,285
SNUBBED RAILWAY TRUCK
Filed Feb. 9, 1959    2 Sheets-Sheet 1
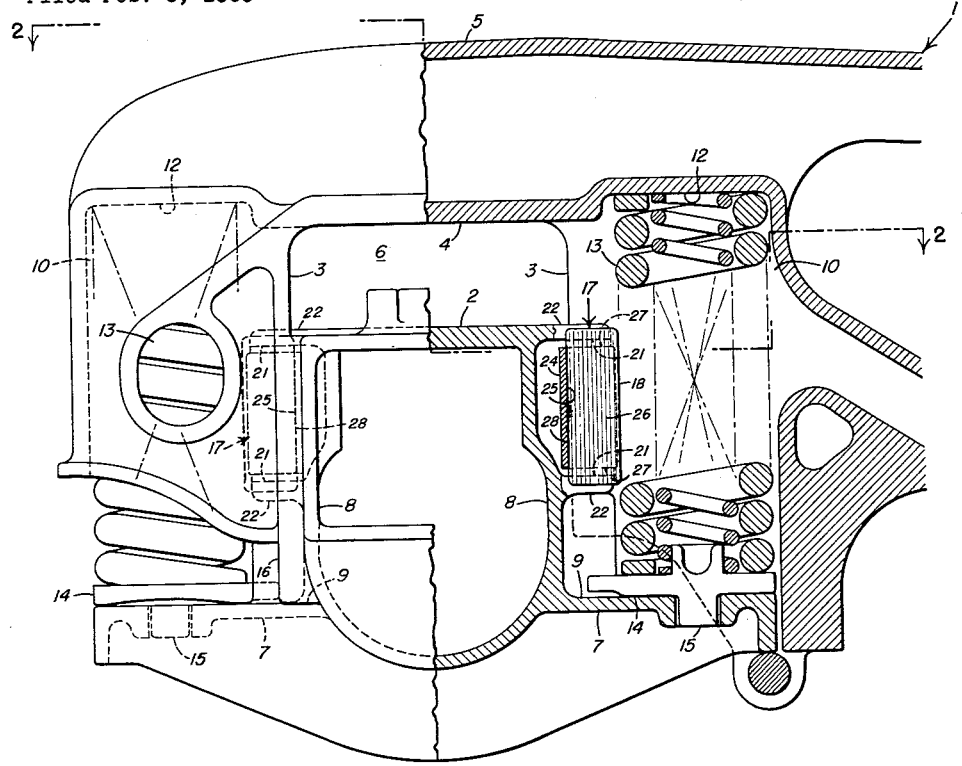
FIG. 1
FIG. 2
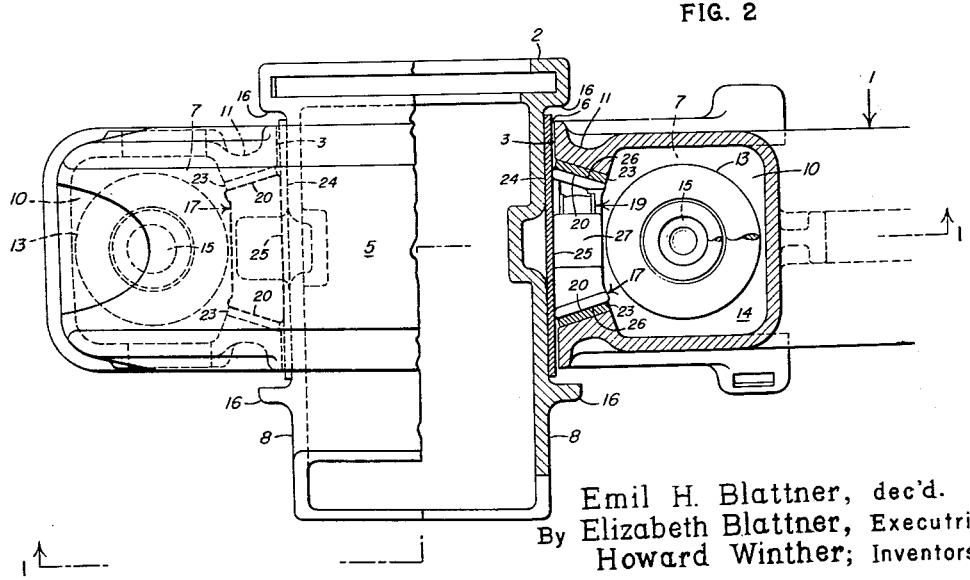
Emil H. Blattner, dec'd.
By Elizabeth Blattner, Executrix
Howard Winther; Inventors.
By Wilmer Mechlin
their Attorney Jan. 2, 1962 E. H. BLATTNER ETAL 3,015,285
SNUBBED RAILWAY TRUCK
Filed Feb. 9, 1959 2 Sheets-Sheet 2

Emil H. Blattner, dec'd.
By Elizabeth Blattner, Executrix,
Howard Winther; Inventors.

By Wilmer Mechlin
their Attorney

United States Patent Office 3,015,285
Patented Jan. 2, 1962

3,015,285
SNUBBED RAILWAY TRUCK
Emil H. Blattner, deceased, late of Williamsville, N.Y., by Elizabeth Blattner, executrix, Rochester, and Howard Winther, Elma, N.Y., assignors to Symington Wayne Corporation, Salisbury, Md., a corporation of Maryland
Filed Feb. 9, 1959, Ser. No. 792,456
11 Claims. (Cl. 105—224)

This invention relates to snubbed railway trucks and has for its primary object the provision in such a truck of improved snubbing means for snubbing by friction engendered under force of rubber spring means relative movement in a plurality of angularly related directions of a pair of members of the truck, one of which is spring-supported on the other.

Another object of the invention is the provision in a snubbed truck of improved snubbing means, wherein rubber in shear supplies force for frictionally snubbing relative movement in a plurality of directions of a pair of spring-supported and supporting members.

An additional object of the invention is to provide in a snubbed truck improved snubbing means, wherein rubber spring means prestressed in shear in a plurality of angularly related directions supplies force for snubbing by friction relative movement in the same directions of a pair of spring-supported and supporting members.

A further object of the invention is to provide in a snubbed truck improved snubbing means wherein friction shoe means having a plurality of angularly related friction faces are acted on by rubber spring means prestressed in shear in directions substantially normal to such faces for urging the faces into frictional engagement with confronting surfaces on a pair of spring-supported and supporting members and snubbing relative movement of the members in directions each substantially parallel to one of the faces.

Other objects and advantages of the invention will appear hereinafter in the detailed description, be particularly pointed out in the appended claims and be illustrated in the accompanying drawings, in which:

FIGURE 1 is a fragmentary view partly in front elevation and partly in vertical section, the latter taken along the lines 1—1 of FIGURE 2, of a snubbed railway truck embodying a preferred form of the snubbing means of the present invention;

FIGURE 2 is a view taken along the lines 2—2 of FIGURE 1;

Figure 3:
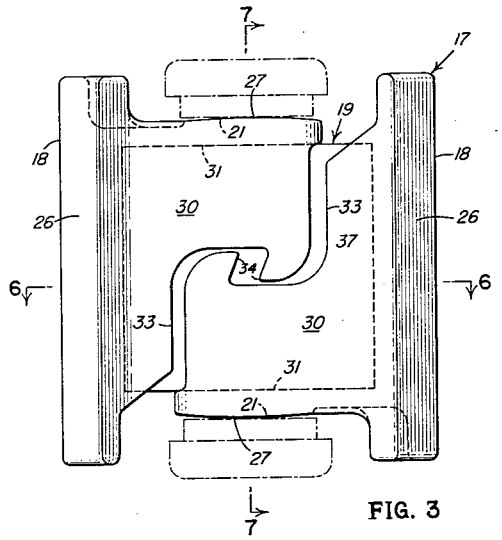
FIGURE 3 is a side elevational view on an enlarged scale of one of the snubbing means shown in FIGURE 1.
Figure 4:
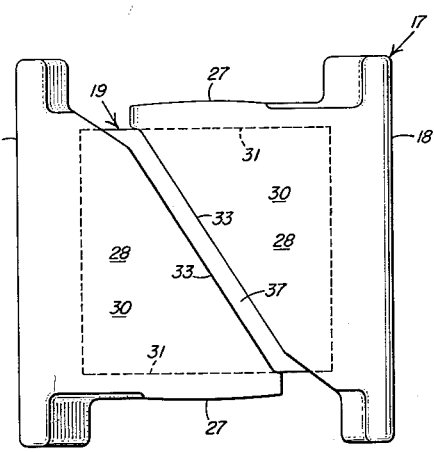
FIGURE 4 is a side elevational view of the opposite side of the snubbing means of FIGURE 3.
Figure 5:
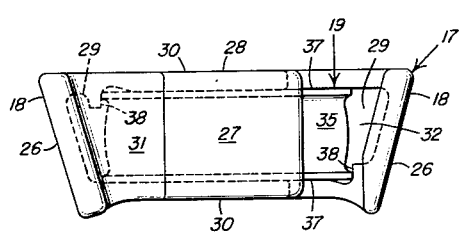
FIGURE 5 is a plan view of the snubbing means of FIGURE 3.

Referring now in detail to the drawings, in which like reference characters designate like parts, the improved snubbing means of the present invention is applicable generally for incorporation in snubbed railway trucks in which it is desired to snub relative movement in a plurality of angularly related directions of a pair of members of the truck, one of which is spring-supported on the other, whether the members are a side frame and bolster, a side frame and journal box, or the base and cap members of a so-called spring package unit. Particularly designed for installation between a side frame and bolster, such as shown in Barrows Patent No. 2,621,611, or a side frame and journal box, such as shown in Couch Patent No. 2,720,848, the improved snubbing means has been applied for purposes of illustration to a truck similar to that of the Couch patent, wherein the spring-supported and supporting members, which are movable relatively in a plurality of angularly related directions, are, respectively, a side frame 1 and a journal box 2.

The side frame 1, only one end portion of which has been shown as sufficing for understanding of the invention, has at that end portion a pair of vertically directed, upstanding or upright guide columns or jaws 3, spaced horizontally, longitudinally of the side frame and embracing or defining with the overlying horizontally directed web 4 of the compression member 5 a window opening 6 opening transversely or laterally of the side frame and, here, downwardly, as well, in which is received or seated the journal box 2. Whether adapted for roller bearings or, as illustrated, a solid bearing, the journal box 2 will have a pair of wings 7 rigid with and outstanding from its opposite sides 8 and each having a substantially horizontally directed upper face 9 facing upwardly toward a pocket 10 in one of the columns 3. Opening both downwardly and toward each other inwardly onto the window opening 6, the pockets 10 are defined inboardly and outboardly, each by the inboard and outboard vertically directed walls 11 of the column 3 in which it is formed. Each of the pockets 10 has at its upper extremity a downwardly facing seat 12 against which seats the upper end of a double coil or other suitable supporting spring 13 supported at its lower end either on the confronting upper face 9 of the related of the wings 7 or, preferably, on a spring plate 14 rockably or otherwise seated on the upper face and positioned thereon by a positioning stud 15.

Movable vertically in the window opening 6 on compression and expansion of the supporting springs 13 under service forces, the journal box 2 also is movable laterally or transversely in the opening to the extent of the spacing between the inboard and outboard guide or stop lugs 16 outstanding from its sides or side walls 8 and the inboard and outboard walls 11 of the guide column which the pair of guide lugs at each side embraces. The side frame 1 and journal box 2 thus, under service forces, can move relatively in a plurality of angularly related directions, here, specifically, vertically and horizontally and the supporting springs 13 in turn accommodate such relative movement. However, if the supporting springs are permitted to respond freely to vertical service forces, they will tend to develop the periodicity in oscillation characteristic of coil springs. If, therefore, the railway truck of which the side frame 1 and journal box 2 form a part is to be adapted for the high speed service now customary in freight movement, it is essential that at least the vertical and, desirably, both the vertical and horizontal relative movements of the side frame and journal box be snubbed. Here applied to the illustrated truck at either side of the journal box 2, the snubbing means of this invention, designated as 17, is effective to snub both of these relative movements of the journal box and side frame.

Movable with one and relative to the other of the spring-supported and supporting members 1 and 2 in each of a plurality of angularly related directions, one, here, vertical and another horizontal and transverse or lateral, the snubbing means 17 is comprised of friction shoe means 18 and rubber spring means 19, the latter acting in shear to urge the shoe means against the relatively moving other member and frictionally resist such relative movement. Each of the preferred embodiments of the snubbing means 17 is contained, confined or housed horizontally between horizontally and transversely spaced, vertically directed, preferably flat friction surfaces 20 on or carried by one of the members and vertically spaced, horizontally directed, preferably flat friction surfaces 21 on or carried by the other member. Where, as here, the spring-supported and supporting members are the side frame 1 and journal box 2, it has been found convenient to form or carry the vertically directed friction surfaces 20 for each snubbing means on the side or inboard and outboard walls 11 of the related guide column 3 and the horizontally directed friction surfaces 21 on a pair of vertically spaced shelves or ledges 22 outstanding substantially horizontally from the adjoining side 8 of the journal box and projecting or extending into the pocket 10 in that column between its side walls 11. Too, it is preferred that at least the vertically directed friction surfaces 20 be formed, rather than directly on the inboard and outboard walls, on wear plates 23 fixed or secured thereto and that the sides 8 of the journal box 2 each be protected by fixing or securing thereto between its shelves 22 and inboard and outboard guide lugs 16 a wear plate 24 having a preferably flat friction surface 25 extending both vertically and transversely of the side frame 1 and confronting or facing the associated pocket 10. While the horizontally directed friction surfaces 21 carried by the shelves 22 preferably are substantially parallel to each other, the vertically directed friction surfaces 20, carried by the inboard and outboard walls 11, preferably flare or diverge outwardly of the pocket 10 toward the journal box 2 and thus the window opening 6 in which the journal box seats, thereby enabling them to serve as wedging surfaces for the purpose hereinafter to be explained.

Contained between the several friction surfaces 20, 21 and 25, each of the preferred snubbing means 17 has as its friction shoe means 18 a pair of preferably substantially counterpart friction shoes or wedges, disposed end to end or in tandem transversely of the side frame 1. Each of the friction shoes 18 has an inboard or outboard, vertically directed, preferably flat friction or wedging face 26 inclined longitudinally of the side frame in correspondence to and adapted to frictionally engage one of the vertically directed outboard and inboard friction or wedging surfaces 20 carried by the side walls 11 of the associated column 3, the friction faces 26, in correspondence with the inboard and outboard friction surfaces, together flaring or diverging toward the confronting side 8 of the journal box 2. One of the shoes also has an upper or top and the other a lower or bottom horizontally directed friction face 27, each of which confronts and is adapted to frictionally engage one of the horizontally directed friction surfaces 21 carried by or formed on the associated pair of journal box shelves 22, these friction faces 27, instead of being flat, preferably being crowned so as to rock on the shelf surfaces 21 and thus accommodate limited vertical angling of the journal box 2 relative to the side frame 1. Additionally, each shoe 18 has one of a pair of vertically and transversely directed, preferably flat and coplanar friction faces 28 confronting and adapted to frictionally engage the correspondingly directed friction surface 25 on the wear plate 24 at the adjoining side 8 of the journal box. The friction shoes 18 of each snubbing means 17 thus have a plurality and, in fact, a multiplicity of horizontally and vertically directed friction faces, each angularly related to the others and each frictionally engageable with one of the plurality or multiplicity of correspondingly directed and related friction surfaces which are carried by or on the side frame 1 and journal box 2 and together house the snubbing means.

Apart from its several friction faces 26, 27 and 28, each of the friction shoes 18 of each pair has an aperture or cavity 29 opening onto its end confronting the other shoe of the pair and confined at the sides by transversely spaced, substantially parallel side webs or walls 30 and at top or bottom by the top or bottom wall 31 of that shoe on which is formed or carried its upper or lower friction surface 27. Together, these apertures form a compartment or pocket 32 in which is housed or contained the rubber spring means 19, the compartment being interrupted at the sides by the spacing provided between the contiguous or confronting inner edges or ends 33 of the corresponding side webs 30 of the shoes. To provide end clearance for limited relative inward endwise movement of the shoes 18 of each pair with a minimum of interruption at the sides of their spring compartment 32, the contiguous but spaced ends 33 of the corresponding side webs 30 preferably are of corresponding configuration and to limit relative outward endwise movement or exploding of the shoes before installation or when removed, the side webs 30 at at least one of the shoes 18 of each pair preferably are provided with vertically and horizontally overlapping interlocking fingers or hooks 34.

Housed in the compartment 32 in the pair of shoes 18 of each snubbing means 17, the rubber spring means 19 preferably is not simply a rubber block, but is a rubber spring unit formed of a block 35 of rubber or like material sandwiched between and bonded or vulcanized at each of its sides 36 to one of a pair of side plates 37. As are the sides of the compartment 32, the sides 36 of the rubber block 35, as well as the side plates 37, are substantially flat and parallel and for the preferred rectangular cross-section or box-shaped compartment, both the block and the side plates are of corresponding shape or section, with the side plates of slightly greater size than and marginally overlapping or projecting or extending beyond the block.

Figure 6:
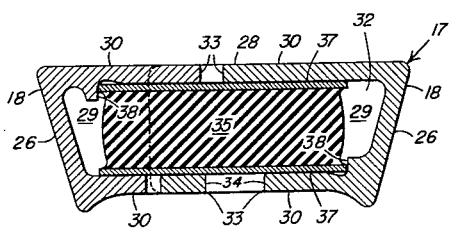
FIGURE 6 is a horizontal sectional view taken along the lines 6—6 of FIGURE 3.
Figure 8:
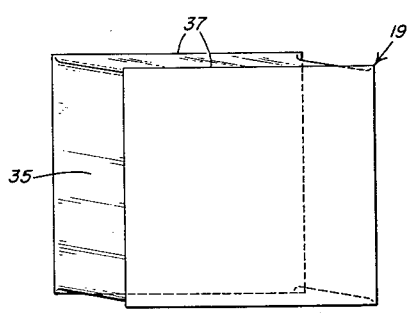
FIGURE 8 is a side elevational view of the rubber spring of the snubbing means of FIGURE 3 showing the spring in unstressed condition.
Figure 10:
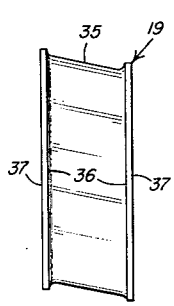
FIGURE 10 is an end elevational view of the spring means of FIGURE 8.
Figure 7:
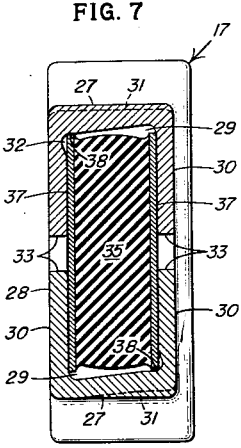
FIGURE 7 is a vertical sectional view taken along the lines 7—7 of FIGURE 3.
Figure 9:
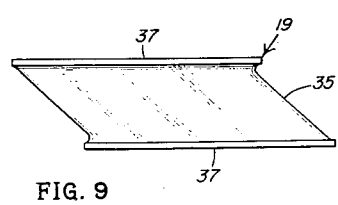
FIGURE 9 is a plan view of the rubber spring of FIGURE 8.

Unlike prior shoe-energizing rubber springs, that of this invention does not depend on compression for the potential energy by which it energizes the friction shoes 18. Instead, it depends for such energy on prestressing, distortion or deflection of the rubber for reaction in shear in a plurality of angularly related directions. Thus, the rubber spring unit 19 in its initial, unstressed or distorted condition shown in FIGURES 8–10, has the sides 36 of its rubber block 35 and therewith the side plates 37 substantially parallel but displaced relative to each other in a plurality of angularly related directions, here vertical and transverse or horizontal, but in the installed condition of the snubbing means, has its sides and side plates substantially aligned, as shown in FIGURES 6 and 7. This change in the condition of the rubber spring unit 19, while entailing sideways compression of the rubber block 35 at least sufficient to hold the unit tight in the spring compartment 32 and thus hold the shoes 18 in alignment, also entails endwise stressing or distortion of the block in shear in two directions at right angles to each other. Furthermore, since the rubber block is contained on both sides by both shoes, its force in compression has no tendency to move the shoes relatively and in urging the shoes relatively in angularly related directions the block acts wholly in shear.

Serving as the reactance against which the rubber block 35 acts in resiliently urging the shoes 18 in the desired plurality of angularly related directions are two angularly related pairs of shoulders or abutments 38 in the spring compartment 32, one shoulder of each pair being on or rigid with each of the shoes and the shoulder of each pair being at or toward opposite sides of the compartment and at or adjacent the latter's opposite horizontal or vertical extremities. With the shoulders 38 of each pair thus diagonally opposite each other and engaging diagonally opposite edges of the side plates 37 forming the correspondingly opposite corners of the spring unit 17, the latter is enabled to urge the friction shoes 18 in a plurality of angularly related directions, one here horizontal and transverse to the side frame 1 and the other vertical. Also, since the resistance of rubber to shear is substantially constant for a given distortion, the force exerted by the spring unit 19 on the shoes in each direction is substantially constant.

The vertical force of the spring unit 19 urging the horizontally directed upper and lower friction faces 27 of the shoes 18 against the confronting friction surfaces 21 carried by the shelves 22 on the journal box 2, and its horizontal force urging the end friction faces 20 of the shoes against the inboard and outboard friction surfaces 26 carried by the column 3, the snubbing unit 17 is enabled to resist, with substantially constant forces, each substantially normal to the direction of one of the friction faces 20 and 21, relative movement of the side frame and journal box both vertically and transversely or laterally with respect to the side frame. In addition, the preferred flaring toward the journal box of the vertically directed friction surfaces 20 on the column and engaging faces 28 on the shoes 18 enables the horizontal force of the spring unit 19 to wedge the vertically and transversely directed friction faces 28 against the correspondingly directed friction surface 25 on the wear plate 24 at the confronting side 8 of the journal box, the frictional engagement of these faces and this surface not only assisting in resisting relative lateral movement of the side frame and journal box, but, by resisting horizontal angling as well as sideways movement of the journal box relative to the side frame, rendering the truck as a whole self-squaring.

From the above detailed description, it will be apparent that there has been provided an improved snubbing means which is energized by rubber in shear to frictionally resist relative movement of spring-supported and supporting members of a railway truck in a plurality of angularly related directions. It should be understood that the described and disclosed embodiment is merely exemplary of the invention and that all modifications are intended to be included which do not depart from either the spirit of the invention or the scope of the appended claims.

What is claimed is:

1. In a railway truck having spring-supported and supporting members relatively movable in a plurality of angularly related directions, snubbing means comprising friction shoe means having a plurality of angularly related friction faces each frictionally engageable with one of a plurality of correspondingly related friction surfaces on said members, and rubber spring means prestressed in shear for reaction in a plurality of angularly related directions and therethrough acting in shear on said shoe means for urging said faces and surfaces into frictional engagement and snubbing said relative movement of said members.

2. In a railway truck having spring-supported and supporting members relatively movable in a plurality of angularly related directions, snubbing means comprising friction shoe means having horizontally and vertically directed friction faces frictionally engageable with correspondingly directed friction surfaces on said members, and rubber spring means prestressed in shear for reaction vertically and horizontally and therethrough acting in shear on said shoe means for urging said faces and surfaces into frictional engagement and snubbing said relative movement of said members.

3. In a railway truck having a pair of spring-supported and supporting members relatively movable in horizontal and vertical directions, snubbing means comprising friction shoe means, a substantially horizontally directed friction face carried by said shoe means and frictionally engageable with a correspondingly directed friction surface carried by one of said members, a substantially vertically directed friction face carried by said shoe means and frictionally engageable with a correspondingly directed friction surface carried by the other member, and rubber spring means prestressed in shear for reaction horizontally and vertically and therethrough acting in shear on said shoe means for urging said friction faces and surfaces into frictional engagement and snubbing said relative movement of said members.

4. In a railway truck having spring-supported and supporting members relatively movable in a plurality of angularly related directions, snubbing means comprising friction shoe means having a plurality of angularly related friction faces each frictionally engageable with one of a plurality of correspondingly related friction surfaces on said members, and rubber spring means housed in said shoe means, said spring means being prestressed in shear for reaction in a plurality of angularly related directions and therethrough acting in shear on said shoe means for urging said faces and surfaces into frictional engagement and snubbing said relative movement of said members.

5. In a railway truck having spring-supported and supporting members relatively movable in a plurality of angularly related directions, snubbing means comprising friction shoe means having a plurality of angularly related friction faces each frictionally engageable with one of a plurality of correspondingly related friction surfaces on said members, and rubber spring means housed in said shoe means, said spring means being prestressed in shear for reaction in a plurality of directions each substantially normal to one of said friction faces and therethrough acting in shear on said shoe means for urging said faces and surfaces into frictional engagement and snubbing said relative movement of said members.

6. In a railway truck having spring-supported and supporting members relatively movable in a plurality of angularly related directions, snubbing means comprising friction shoe means having a plurality of angularly related friction faces each frictionally engageable with one of a plurality of correspondingly related friction surfaces on said members, and rubber spring means including rubber means and plate means bonded thereto, said spring means being housed in said shoe means, and said spring means being prestressed in shear in a plurality of directions each substantially normal to one of said angularly related directions and therethrough acting in shear on said shoe means for urging said faces and surfaces into frictional engagement and snubbing said relative movement of said members.

7. In a railway truck having spring-supported and supporting members relatively movable in a plurality of angularly related directions, snubbing means comprising friction shoe means having a plurality of angularly related friction faces each frictionally engageable with one of a plurality of correspondingly related friction surfaces on said members, and rubber spring means including a rubber block and a plurality of plates bonded thereto, said spring means being housed in said shoe means, and said spring means being prestressed in shear for reaction in a plurality of directions substantially normal to one of said angularly related directions and therethrough acting in shear for urging said faces and surfaces into frictional engagement and snubbing said relative movement of said members.

8. In a railway truck having spring-supported and supporting members relatively movable in a plurality of angularly related directions, snubbing means comprising friction shoe means having a plurality of angularly related friction faces each frictionally engageable with one of a plurality of correspondingly related friction surfaces on said members, and rubber spring means including a rubber block having substantially parallel sides and side plates each bonded to one of said sides, said rubber block being prestressed in shear for reaction in a plurality of angularly related directions and acting in said directions through said side plates on said shoe means for urging said faces and surfaces into frictional engagement and snubbing said relative movement of said members.

9. In a railway truck having a pair of spring-supported and supporting members movable in a plurality of angularly related directions, a pair of friction surfaces carried by one of said members and spaced in and extending substantially normal to one of said directions, and a pair of friction surfaces carried by the other member and spaced in and extending substantially normal to another of said directions, snubbing means comprising friction shoe means having a plurality of angularly related pairs of spaced friction faces each frictionally engageable with said friction surfaces on one of said members, a spring compartment in said friction shoe means, and rubber spring means housed in said compartment, said spring means being prestressed for reaction in a plurality of directions each substantially normal to one of said angularly related directions and acting in said directions on said shoe means for urging said faces and surfaces into frictional engagement and snubbing said relative movement of said members.

10. In a railway truck having a pair of spring-supported and supporting members movable in a plurality of angularly related directions, a pair of friction surfaces carried by one of said members and spaced in and extending substantially normal to one of said directions, and a pair of friction surfaces carried by the other member and spaced in and extending substantially normal to another of said directions, snubbing means comprising a plurality of friction shoes, a plurality of angularly related pairs of friction faces carried by said shoes and each frictionally engageable with said friction surfaces on one of said members, a spring compartment in said friction shoes, and rubber spring means housed in said compartment, said spring means being prestressed for reaction in a plurality of directions each substantially normal to one of said angularly related directions and acting in said directions on said friction shoes for urging said faces and surfaces into frictional engagement and snubbing said relative movement of said members.

11. In a railway truck having a pair of spring-supported and supporting members movable in a plurality of angularly related directions, a pair of friction surfaces carried by one of said members and spaced in and extending substantially normal to one of said directions, and a pair of friction surfaces carried by the other member and spaced in and extending substantially normal to another of said directions, snubbing means comprising a pair of friction shoes having a plurality of angularly related pairs of spaced friction faces each frictionally engageable with said friction surfaces on one of said members, a spring compartment in and common to said shoes, and rubber spring means including a rubber block having substantially parallel sides and side plates bonded to said sides and sandwiching said block, said spring means being housed in said compartment with said block prestressed in shear for reaction in a plurality of directions each substantially normal to one of said angularly related directions, and a plurality of angularly related pairs of diagonally disposed shoulders in said compartment, each engaging an edge of one of said plates, said block acting through said plates and shoulders for urging said shoes relatively in said plurality of substantially normal directions and thereby urging said faces and surfaces into frictional engagement for snubbing said relative movement of said members.

References Cited in the file of this patent
UNITED STATES PATENTS

| | | |
|---|---|---|
| 2,552,144 | Barrows | May 8, 1951 |
| 2,565,650 | Dath | Aug. 28, 1951 |
| 2,590,360 | Barrows | Mar. 25, 1952 |
| 2,720,848 | Couch | Oct. 18, 1955 |